United States Patent
Kim et al.

(10) Patent No.: US 8,718,153 B2
(45) Date of Patent: May 6, 2014

(54) SIGNAL TRANSMITTING APPARATUS, METHOD THEREOF, AND INVERSE FAST FOURIER TRANSFORM APPARATUS FOR SIGNAL TRANSMITTING APPARATUS

(75) Inventors: Jun-Woo Kim, Daejeon (KR); Dae-Ho Kim, Daejeon (KR); Young-Ha Lee, Daejeon (KR); Youn-Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 1002 days.

(21) Appl. No.: 12/105,172

(22) Filed: Apr. 17, 2008

(65) Prior Publication Data
US 2009/0060069 A1    Mar. 5, 2009

(30) Foreign Application Priority Data
Aug. 31, 2007  (KR) ................ 10-2007-0088102

(51) Int. Cl.
*H04K 1/10* (2006.01)
*H04L 27/28* (2006.01)

(52) U.S. Cl.
USPC ......... 375/260; 342/196; 370/210; 708/403; 708/404; 708/405

(58) Field of Classification Search
USPC .................. 375/260; 342/196; 370/210; 708/403–405
See application file for complete search history.

(56) References Cited

U.S. PATENT DOCUMENTS

| | | | |
|---|---|---|---|
| 7,693,040 B1* | 4/2010 | Bhugra et al. | 370/208 |
| 7,870,176 B2* | 1/2011 | Solomon et al. | 708/400 |
| 2003/0076904 A1* | 4/2003 | Magee | 375/340 |
| 2004/0081131 A1* | 4/2004 | Walton et al. | 370/344 |
| 2004/0086054 A1* | 5/2004 | Corral | 375/260 |

(Continued)

FOREIGN PATENT DOCUMENTS

| | | |
|---|---|---|
| KR | 10-2005-0070087 A | 7/2005 |
| KR | 10-2006-0035939 A | 4/2006 |
| KR | 10-2006-0073257 A | 6/2006 |
| WO | 2004/039027 A2 | 5/2004 |

OTHER PUBLICATIONS

Fredrik Kristensen, et al., "Reduced Transceiver-delay for OFDM system", Vehicular Technology Conference, 2004. VTC 2004-Spring. 2004 IEEE 59th, May 17-19, 2004, vol. 3, on pp. 1242-1245 vol. 3, ISSN: 1550-2252.

*Primary Examiner* — Shuwang Liu
*Assistant Examiner* — Sung Ahn
(74) *Attorney, Agent, or Firm* — Jefferson IP Law, LLP

(57) ABSTRACT

The present invention relates to a signal transmitting apparatus, a method thereof, and an inverse fast Fourier transform (IFFT) apparatus for a signal transmitting apparatus. A signal transmitting apparatus according to an embodiment of the present invention receives data, and performs inverse fast Fourier transform (IFFT) on the data on the basis of a twiddle factor for shifting output data by the size of a cyclic prefix. In addition, the signal transmitting apparatus sequentially stores data corresponding to the size of the cyclic prefix starting with initial data among the transformed data, and generates an OFDM symbol on the basis of the stored data and the transformed data. According to the embodiment of the present invention, it is possible to efficiently reduce a time delay and a memory use amount when a cyclic prefix is added at a transmitting end, without changing the size of hardware and power consumption.

8 Claims, 7 Drawing Sheets

(56) References Cited

U.S. PATENT DOCUMENTS

| | | | |
|---|---|---|---|
| 2004/0151110 A1* | 8/2004 | Mazzoni et al. | 370/210 |
| 2005/0047325 A1* | 3/2005 | Singh et al. | 370/210 |
| 2006/0087961 A1 | 4/2006 | Chang et al. | |
| 2006/0133527 A1 | 6/2006 | Yu et al. | |
| 2006/0224651 A1* | 10/2006 | Madhavapeddi et al. | 708/404 |
| 2007/0133393 A1* | 6/2007 | Bocquet | 370/210 |
| 2008/0140750 A1* | 6/2008 | Kershaw et al. | 708/490 |
| 2008/0307026 A1* | 12/2008 | Cho et al. | 708/404 |

* cited by examiner

SIGNAL TRANSMITTING APPARATUS, METHOD THEREOF, AND INVERSE FAST FOURIER TRANSFORM APPARATUS FOR SIGNAL TRANSMITTING APPARATUS

CROSS-REFERENCE TO RELATED APPLICATION

This application claims priority to and the benefit of Korean Patent Application No. 10-2007-0088102 filed in the Korean Intellectual Property Office on Aug. 31, 2007, the entire contents of which are incorporated herein by reference.

BACKGROUND OF THE INVENTION (a) Field of the Invention

The present invention relates to a signal transmitting apparatus and a method thereof. More particularly, the present invention relates to a signal transmitting apparatus that efficiently reduces a time delay and a memory use amount when a cyclic prefix is added at a transmission end of an OFDM (orthogonal frequency division multiplexing) system, to a method thereof, and to an inverse fast Fourier transform (IFFT) apparatus for a signal transmitting apparatus.

(b) Description of the Related Art

At a transmitting end of an OFDM system, an inverse FFT (inverse fast Fourier transform; hereinafter referred to as "IFFT") computation is performed, and then a last portion of each OFDM symbol is added to a front portion of the symbol as a cyclic prefix (hereinafter referred to as "CP") to complete a single OFDM symbol.

Here, the cyclic prefix is inserted to prevent orthogonality from being destroyed due to a subcarrier delay.

The transmitting end in the known OFDM system will be described with reference to FIG. 1.

FIG. 1 is a block diagram showing a transmitting end of a known OFDM system.

As shown in FIG. 1, a transmitting end of a known OFDM system includes a QAM (quadrature amplitude modulation) mapper 100, a carrier randomizer 110, a memory 120, an IFFT unit 130, and a symbol re-ordering memory 140.

The QAM mapper 100 and the carrier randomizer 110 perform symbol allocation and carrier insertion on received source data.

The memory 120 temporarily stores data that is transmitted from the carrier randomizer 110 and sequentially transmits the data to the IFFT unit 130. Then, the IFFT unit 130 performs the inverse fast Fourier transform (IFFT) on the received data and transmits the transformed data to the symbol re-ordering memory 140.

The symbol re-ordering memory 140 adds the last portion of the symbol transmitted from the IFFT unit 130 to the head of the symbol to generate a single OFDM symbol, and transmits the generated OFDM symbol.

At the transmitting end of the known OFDM system, as shown in FIG. 2, since the last one of the result values of the inverse fast Fourier transform (IFFT) is added to the head of the symbol, it is necessary to store all of the result values of the inverse fast Fourier transform (IFFT) in the memory and then read all of the result values. Accordingly, as shown in FIG. 2, there is a problem in that a time delay occurs. In addition, since it is necessary to read all of the result values of the inverse fast Fourier transform (IFFT), an additional memory is needed within the transmitting end of the OFDM system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a signal transmitting apparatus and a method thereof that is capable of efficiently reducing a time delay and a memory use amount when a cyclic prefix is added at a transmitting end of an OFDM (orthogonal frequency division multiplexing) system.

An exemplary embodiment of the present invention provides a signal transmitting apparatus, including:

a first memory that stores received data and re-orders the stored data; an IFFT unit that stores a twiddle factor for shifting an output of inverse fast Fourier transform (IFFT) by the size of a cyclic prefix, and performs the inverse fast Fourier transform (IFFT) on data sequentially transmitted from the first memory on the basis of the twiddle factor; a second memory that stores data, which is to be used as the cyclic prefix, among output data from the IFFT unit; and a multiplexer that generates an OFDM (orthogonal frequency division multiplexing) symbol on the basis of the cyclic prefix stored in the second memory and the inverse fast Fourier transform (IFFT) value.

The second memory may sequentially store data corresponding to the size of the cyclic prefix starting with initial output data among output data from the IFFT unit so as to store the cyclic prefix.

Another embodiment of the present invention provides a single transmitting method in a signal transmitting apparatus, which transmits an OFDM symbol.

The method includes: receiving data; performing inverse fast Fourier transform (IFFT) on the data on the basis of a twiddle factor for shifting output data by the size of a cyclic prefix; sequentially storing data corresponding to the size of the cyclic prefix starting with initial data among transformed data; and generating the OFDM symbol on the basis of the stored data and the transformed data.

The signal transmitting method may further include generating the twiddle factor on the basis of the size of the cyclic prefix and the size of fast Fourier transform (FFT) for the inverse fast Fourier transform (IFFT), and storing the generated twiddle factor.

Still another embodiment of the present invention provides an inverse fast Fourier transform (IFFT) apparatus for a signal transmitting apparatus in an OFDM system.

The IFFT apparatus includes: a first memory that stores a twiddle factor for shifting an output of inverse fast Fourier transform (IFFT) by the size of a cyclic prefix; a first shift register that stores data that is subjected to a butterfly computation; a first butterfly unit that performs the first butterfly computation on received data and the data stored in the first shift register; a first multiplier that multiplies data transmitted from the first butterfly unit by the twiddle factor stored in the first memory; a second shift register that stores data subjected to a second butterfly computation; a second butterfly unit that performs the second butterfly computation on the basis of data transmitted from the first multiplier and the data stored in the second shift register; a second multiplier that multiplies data transmitted from the second butterfly unit by the pre-stored twiddle factor for fast Fourier transform (FFT); a third shift register that stores data that is subjected to a third butterfly computation; and a third butterfly unit that performs the third butterfly computation on the basis of data transmitted from the second multiplier and the data stored in the third shift register.

The IFFT apparatus may further include a controller that generates the twiddle factor. The controller may generate the twiddle factor on the basis of the size of the cyclic prefix and the size of the FFT (fast Fourier transform) for the inverse fast Fourier transform (IFFT).

According to the embodiments of the present invention, at the transmitting end of the OFDM system, it is possible to efficiently reduce a time delay and a memory use amount when a cyclic prefix is added, without changing the size of hardware and power consumption.

Furthermore, as the time delay and the memory use amount are reduced, it is possible to increase data processing capability at the transmitting end.

DETAILED DESCRIPTION OF THE EMBODIMENTS

Figure 1:
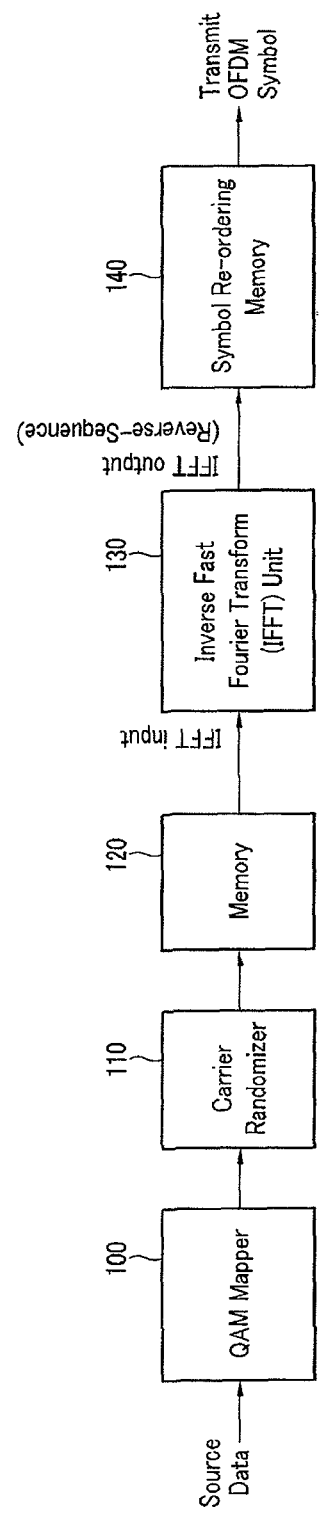
FIG. 1 is a block diagram showing a transmitting end of a known OFDM system.
Figure 2:
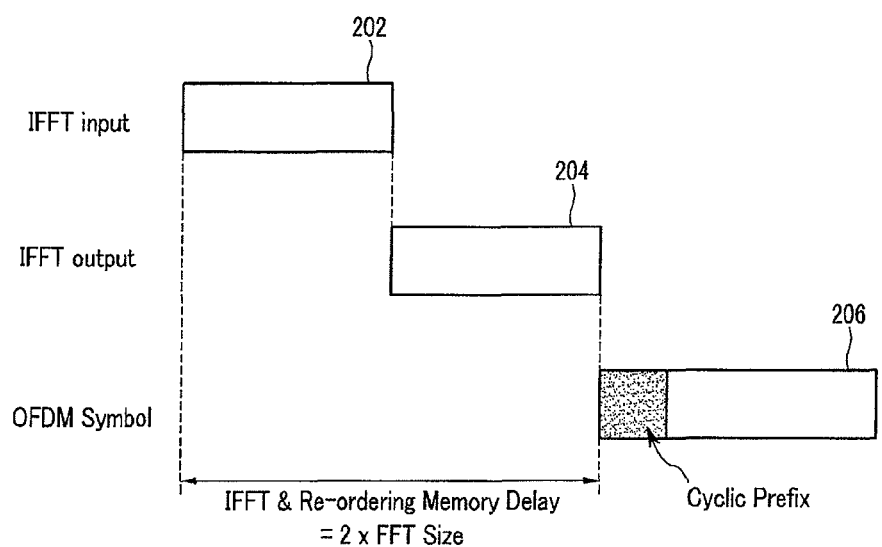
FIG. 2 is a block diagram showing a delay when a cyclic prefix is inserted at the transmitting end of the known OFDM system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the term "comprise" and variations such as "comprises" and "comprising", when used herein, specify the presence of constituent elements, but do not preclude the presence or addition of other constituent elements. The term "section", "-er (-or)", or "module" used herein mean a unit that processes at least one function or operation. This can be implemented by hardware, software, or a combination thereof.

A signal transmitting apparatus and a method thereof according to an exemplary embodiment of the present invention will now be described with reference to the drawings.

First, a signal transmitting apparatus according to an exemplary embodiment of the present invention will be described with reference to FIGS. 3 and 4.

Figure 3:
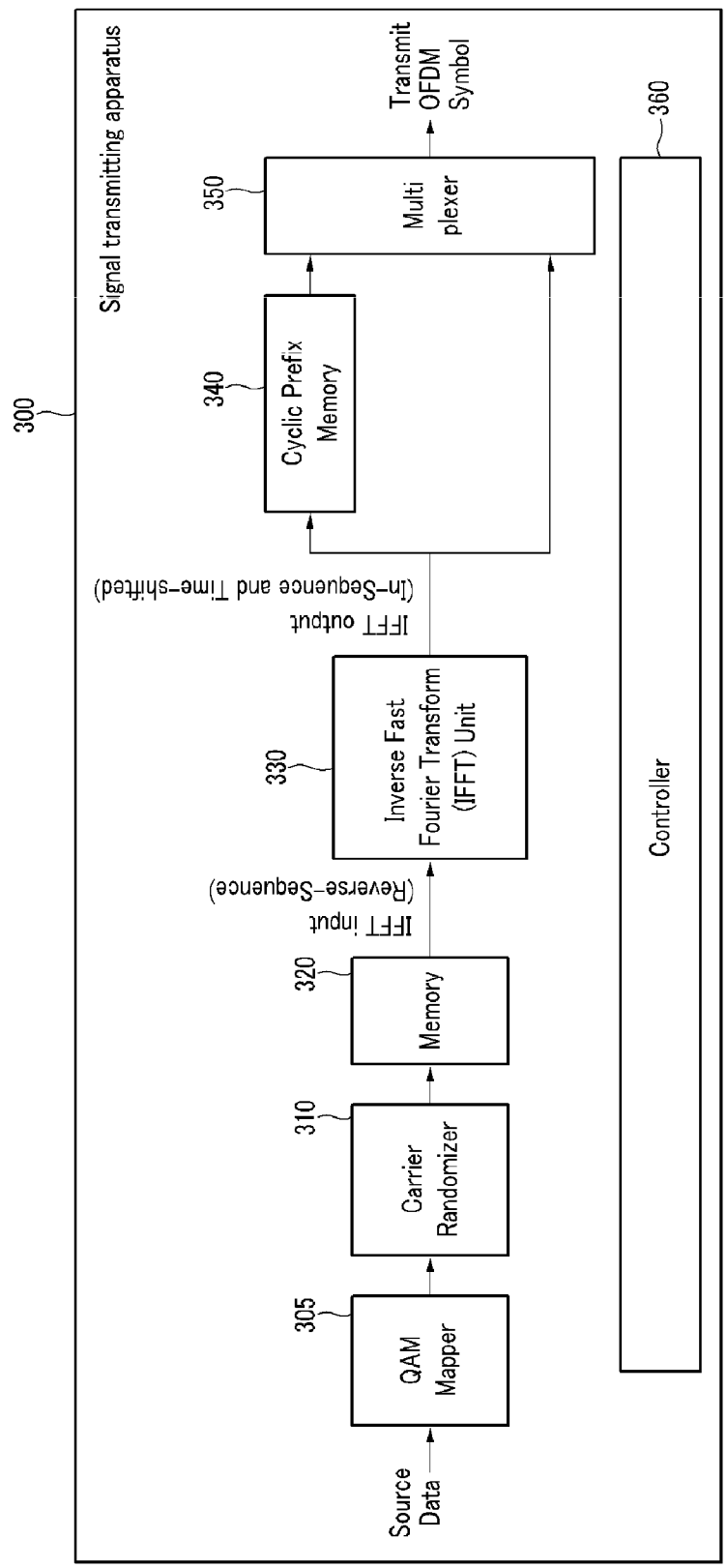
FIG. 3 is a block diagram showing a signal transmitting apparatus according to an embodiment of the present invention.

FIG. 3 is a block diagram showing a signal transmitting apparatus according to an exemplary embodiment of the present invention.

As shown in FIG. 3, a signal transmitting apparatus 300 according to an embodiment of the invention includes a QAM (quadrature amplitude modulation) mapper 305, a carrier randomizer 310, a memory 320, an IFFT unit 330, a cyclic prefix memory 340, a multiplexer 350, and a controller 360.

The QAM mapper 305 and the carrier randomizer 310 perform symbol allocation and carrier insertion on received source data.

The memory 320 temporarily stores data transmitted from the carrier randomizer 310 and then sequentially transmits the stored data to the IFFT unit 330.

At this time, the memory 320 performs a re-ordering function to re-order data transmitted from the carrier randomizer 310, and to sequentially transmit the re-ordered data to the IFFT unit 330, thereby preventing occurrence of an additional time delay.

The IFFT unit 330 performs inverse fast Fourier transform (IFFT) on the data transmitted from the memory 320. In this case, the IFFT unit 330 performs the inverse fast Fourier transform (IFFT) on the basis of the pre-stored twiddle factor for shifting an output of the inverse fast Fourier transform by the size of a cyclic prefix.

At this time, the IFFT unit 330 receives and stores the twiddle factor from the controller 360.

The IFFT unit 330 will be described below with reference to FIG. 4.

The cyclic prefix memory 340 temporarily stores data, which is to be used as the cyclic prefix, among data output from the IFFT unit 330. At this time, the cyclic prefix memory 340 sequentially receives and temporarily stores data corresponding to the size of the cyclic prefix starting with initial output data among data subjected to the inverse fast Fourier transform (IFFT).

The multiplexer 350 combines data transmitted from the IFFT unit 340 with data transmitted from the cyclic prefix memory 340 to generate an OFDM symbol, and transmits the generated OFDM symbol through a transmitter.

Specifically, the multiplexer 350 generates the OFDM symbol by copying the cyclic prefix stored in the cyclic prefix memory 340 and adding the copied cyclic prefix to an end portion of the inverse fast Fourier transform (IFFT) value.

The controller 360 controls the individual units 300, 310, 320, 330, 340, and 350 of a transmitting end, receives information on the size of the cyclic prefix from an administrator, and generates the twiddle factor on the basis of the size of the cyclic prefix by Equation 1.

$$\text{Twiddle Factor} = e^{j\frac{2\pi \times CP\_SIZE}{FFT\_SIZE}k} \quad \text{(Equation 1)}$$

Here, k denotes a variable (1 to k), and FFT_SIZE denotes the size of fast Fourier transform (FFT) that is used by the IFFT unit 330 for the inverse fast Fourier transform (IFFT).

The twiddle factor is generated on the basis of the frequency conversion characteristics of the FFT as represented by Equation 2.

$$F_{(k+M)} = FFT\left(f_n e^{j\frac{2\pi Mn}{N}}\right) \quad \text{(Equation 2)}$$

Next, an IFFT unit of a transmitting end according to an embodiment of the present invention will be described with reference to FIG. 4.

Figure 4:
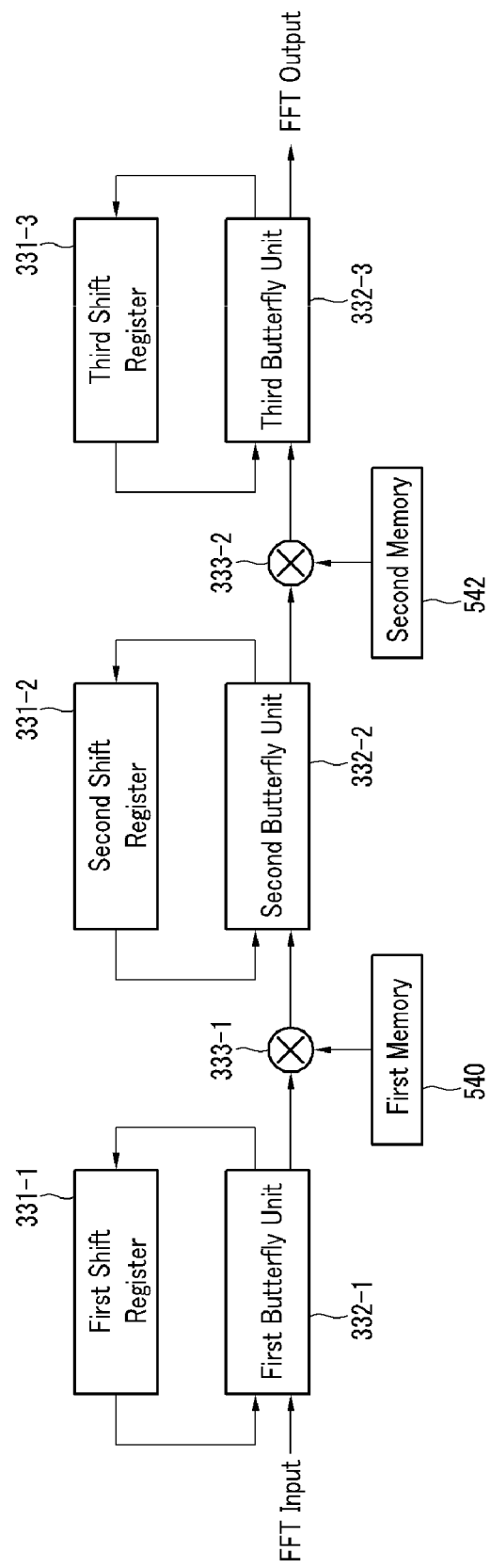
FIG. 4 is a block diagram showing an IFFT unit of a transmitting end according to an embodiment of the present invention.

FIG. 4 is a block diagram showing an IFFT unit of a transmitting end according to an embodiment of the present invention.

As shown in FIG. 4, an IFFT unit 330 of a transmitting end according to an embodiment of the present invention includes first to third shift registers 331-1, 331-2, and 331-3, first to third butterfly units 332-1, 332-2, and 332-3, first and second multipliers 333-1 and 333-2, and first and second memories 334-1 and 334-2.

The first shift register 331-1 temporarily stores an output value transmitted from the first butterfly unit 332-1 and transmits the stored value to the first butterfly unit 332-1.

The first butterfly unit 332-1 performs a butterfly computation on the basis of input data and the data transmitted from the first shift register 331-1, and transmits the computation value to the first shift register 331-1 and the first multiplier 333-1.

The first multiplier 333-1 multiplies the data transmitted from the first butterfly unit 332-1 by the twiddle factor in the first memory 334, and outputs the multiplication value.

At this time, the twiddle factor is a value that is received from the controller 360 shown in FIG. 3. The twiddle factor is generated by the controller 360 to shift the output value of the IFFT unit 330 by the size of the cyclic prefix.

The operation of the IFFT unit 330 will be described below with reference to FIG. 6.

The second shift register 331-2 temporarily stores a value output from the second butterfly unit 332-2.

The second butterfly unit 332-2 performs a butterfly computation on the basis of the data transmitted from the first multiplier 333-1 and data transmitted from the second shift register 331-2, and transmits the computation value to the second shift register 331-2 and the second multiplier 333-2.

The second multiplier 333-2 multiples the data transmitted from the second butterfly unit 332-2 by the twiddle factor in the second memory 335, and transmits the multiplication value to the third butterfly unit 332-3.

At this time, the twiddle factor in the second memory 335 is a value that is pre-stored for a general IFFT computation. In the embodiment of the present invention, the twiddle factor is a twiddle factor that is used for Radix-2 transform.

The third shift register 331-3 temporarily stores a value output from the third butterfly unit 332-3.

The third butterfly unit 332-3 performs a butterfly computation on the basis of the data transmitted from the second multiplier 333-2 and data transmitted from the third shift register 331-3, and transmits the computation value to the third shift register 331-3 and a next stage.

Even though, in the embodiment of the present invention, the IFFT unit is implemented with Radix-2 FFT, it may also be implemented with an FFT such as Radix 4 or Radix $2^2$, in which the twiddle factor is multiplied for every two butterflies.

Next, a delay when a cyclic prefix is inserted at a transmitting end in an OFDM system according to an embodiment of the present invention will be described with reference to FIG. 5.

Figure 5:
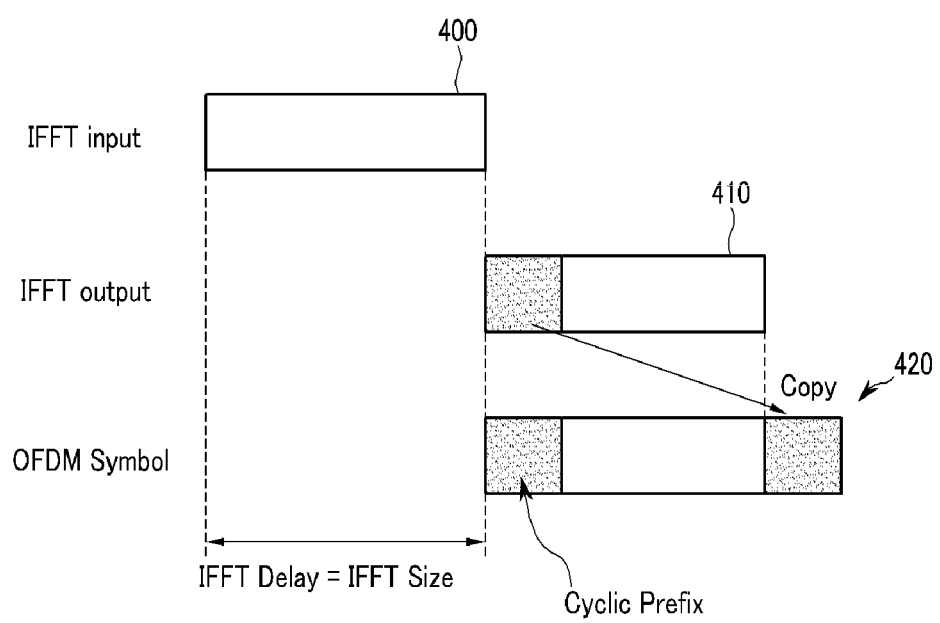
FIG. 5 is a block diagram showing a delay when a cyclic prefix is inserted, in a signal transmitting apparatus according to an embodiment of the present invention.

FIG. 5 is a diagram showing a delay when a cyclic prefix is inserted, in a signal transmitting apparatus according to an embodiment of the present invention.

As shown in FIG. 5, the signal transmitting apparatus according to the embodiment of the present invention outputs the IFFT value that is shifted by the cyclic prefix using the twiddle factor. Accordingly, it is possible to efficiently reduce a delay time, as compared with the related art where part of the last data of the IFFT value is added as the cyclic prefix.

Figure 6:
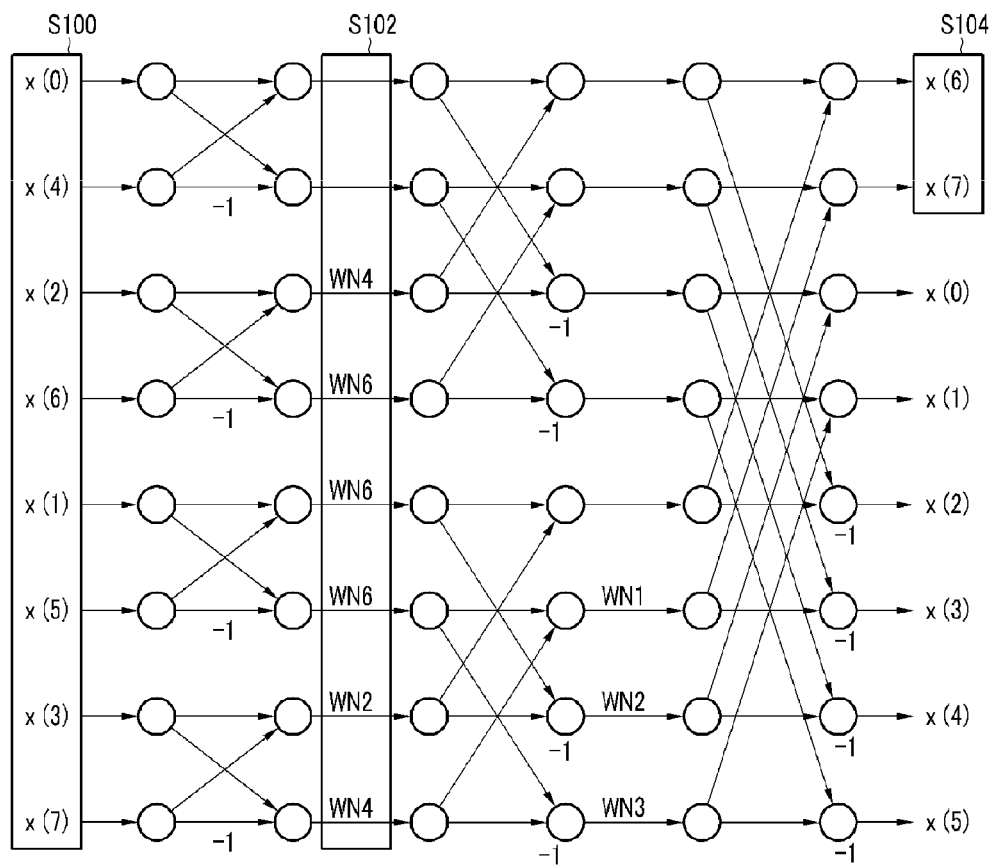
FIG. 6 is a diagram showing a computation operation of an IFFT unit according to an embodiment of the present invention.

FIG. 6 is a diagram showing a computation operation of an IFFT unit according to an embodiment of the present invention.

As shown in FIG. 6, the IFFT unit 330 according to the embodiment of the present invention sequentially receives the re-ordered data from the memory 320 shown in FIG. 3 (Step S100).

Next, the first multiplier 333-1 of the IFFT unit 330 multiplies the data transmitted from the first butterfly unit 331-1 by the twiddle factor so as to shift the output value of the inverse fast Fourier transform (IFFT) by the cyclic prefix (Step S102).

With the computation of the first multiplier 333-1, it is possible to shift the IFFT value calculated by the IFFT unit by the cyclic prefix (Step S104).

Next, the second multiplier 333-2 multiplies the data, which is subjected to the butterfly computation by the second butterfly unit 332-2, by the pre-stored twiddle factor, and transmits the multiplication value to the third butterfly unit 332-3. Then, the third butterfly unit 332-3 performs the butterfly computation on the received data.

A signal transmitting method according to an embodiment of the present invention will be described in detail with reference to FIG. 7.

Figure 7:
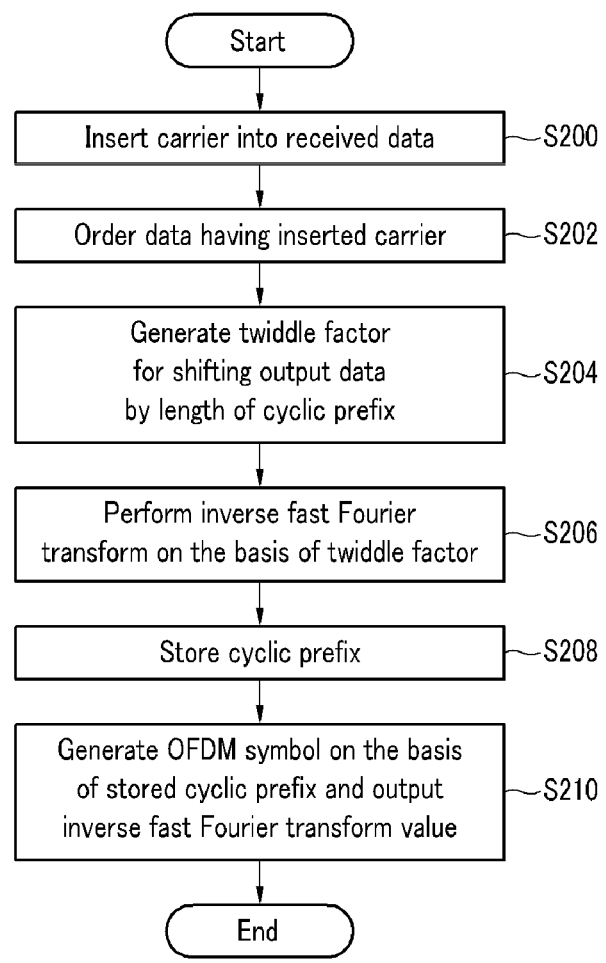
FIG. 7 is a flowchart illustrating a signal transmitting method in a signal transmitting apparatus according to an embodiment of the present invention.

FIG. 7 is a flowchart illustrating a signal transmitting method in a signal transmitting apparatus according to an embodiment of the present invention.

As shown in FIG. 7, in a signal transmitting method according to an embodiment of the present invention, a signal transmitting apparatus first receives source data from an upper stage.

A signal transmitting apparatus 300 inserts a carrier into the received source data (Step S200), and orders the data having inserted the carrier (Step S202).

The signal transmitting apparatus 300 receives information on the size of the cyclic prefix from an administrator, and generates the twiddle factor corresponding to the cyclic prefix by Equation 1 (Step S204).

Next, the signal transmitting apparatus 300 performs the inverse fast Fourier transform (IFFT) on the ordered data on the basis of the twiddle factor (Step S206), and stores data corresponding to the size of the cyclic prefix among output data after the inverse fast Fourier transform (IFFT) as the cyclic prefix (Step S208).

The signal transmitting apparatus 300 generates an OFDM symbol on the basis of the data stored in the memory and the data subjected to the inverse fast Fourier transform (IFFT), and transmits the generated OFDM symbol (Step S210).

With the signal transmitting method according to the embodiment of the present invention, it is possible to efficiently reduce a time delay and a memory use amount when a cyclic prefix is added.

The embodiment of the present invention described above is not be implemented by only the method and apparatus, but it may also be implemented by a program for executing the functions corresponding to the configuration of the exemplary embodiment of the present invention or a recording medium having recorded thereon the program. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A signal transmitting apparatus, comprising:
a first memory that stores received data and re-orders the stored data;
an inverse fast Fourier transform (IFFT) unit that stores a twiddle factor for shifting an output of IFFT by the size of a cyclic prefix, and performs the IFFT on data sequentially transmitted from the first memory on the basis of the twiddle factor;
a second memory that stores data, which is to be used as the cyclic prefix, among output data from the IFFT unit;
a multiplexer that generates an OFDM (orthogonal frequency division multiplexing) symbol on the basis of the cyclic prefix stored in the second memory and the IFFT value; and
a controller that receives the size of the cyclic prefix from a user, and generates the twiddle factor based on a value obtained by dividing the size of the cyclic prefix that is multiplied by a predetermined value by a prescribed size of a fast Fourier transform (FFT) for the IFFT,
wherein the twiddle factor is generated according to a formula:

$$e^{j\frac{2\pi \times CP\_SIZE}{FFT\_SIZE}k},$$

and
wherein a frequency conversion characteristics of the FFT is determined according to the following formula:

$$F_{(k+M)} = FFT\left(f_n e^{\frac{j2\pi Mn}{N}}\right).$$

2. The signal transmitting apparatus of claim 1, wherein the second memory sequentially stores data corresponding to the size of the cyclic prefix starting with initial output data among output data from the IFFT unit so as to store the cyclic prefix.

3. The signal transmitting apparatus of claim 2, wherein the multiplexer generates the OFDM symbol by copying the cyclic prefix and adding the copied cyclic prefix to an end portion of the IFFT value.

4. A signal transmitting method in a signal transmitting apparatus that transmits an Orthogonal Frequency Division Multiplexing (OFDM) symbol, the method comprising:
receiving data;
performing inverse fast Fourier transform (IFFT) on the data on the basis of a twiddle factor for shifting output data by the size of a cyclic prefix;
sequentially storing data corresponding to the size of the cyclic prefix starting with initial data among the transformed data; and
generating the OFDM symbol on the basis of the stored data and the transformed data,
wherein the size of the cyclic prefix is determined by a user, and
wherein the twiddle factor is generated based on a value obtained by dividing the size of the cyclic prefix that is multiplied by a predetermined value by a prescribed size of a fast Fourier transform (FFT) for the IFFT,
wherein the twiddle factor is generated according to a formula:

$$e^{j\frac{2\pi \times CP\_SIZE}{FFT\_SIZE}k},$$

and
wherein a frequency conversion characteristics of the FFT is determined according to the following formula:

$$F_{(k+M)} = FFT\left(f_n e^{\frac{j2\pi Mn}{N}}\right).$$

5. The method of claim 4, further comprising:
storing the twiddle factor on the basis of the size of the cyclic prefix and the size of the FFT for the IFFT.

6. The method of claim 5, wherein the generating of the OFDM symbol includes:
copying the stored data; and
adding the copied data to the transformed data to generate the OFDM symbol.

7. An inverse fast Fourier transform (IFFT) apparatus for a signal transmitting apparatus in an Orthogonal Frequency Division Multiplexing (OFDM) system, the IFFT apparatus comprising:
a first memory that stores a twiddle factor for shifting an output of IFFT by the size of a cyclic prefix;
a first shift register that stores data subjected to a first butterfly computation;
a first butterfly unit that performs the first butterfly computation on the basis of received data and the data stored in the first shift register;
a first multiplier that multiplies data transmitted from the first butterfly unit by the twiddle factor in the first memory;
a second shift register that stores data subjected to a second butterfly computation;
a second butterfly unit that performs the second butterfly computation on the basis of data transmitted from the first multiplier and the data stored in the second shift register;
a second multiplier that multiplies data transmitted from the second butterfly unit by the pre-stored twiddle factor for fast Fourier transform (FFT);
a third shift register that stores data subjected to a third butterfly computation; and
a third butterfly unit that performs the third butterfly computation on the basis of data transmitted from the second multiplier and the data stored in the third shift register,
wherein the size of the cyclic prefix is determined by a user,
wherein the twiddle factor is generated based on a value obtained by dividing the size of the cyclic prefix that is multiplied by a predetermined value by a prescribed size of an FFT for the IFFT, and
wherein a frequency conversion characteristics of the FFT is determined according to the following formula:

$$F_{(k+M)} = FFT\left(f_n e^{\frac{j2\pi Mn}{N}}\right).$$

8. The IFFT apparatus of claim 7, further comprising a controller that generates the twiddle factor,
wherein the controller generates the twiddle factor on the basis of the size of the cyclic prefix and the size of FFT for the IFFT.

* * * * *